United States Patent [19]

Humenik et al.

[11] 4,122,460
[45] Oct. 24, 1978

[54] INK JET NOZZLE STRUCTURES

[75] Inventors: James N. Humenik, LaGrangeville; Jimmie L. Powell; Rao R. Tummala, both of Wappingers Falls, all of N.Y.

[73] Assignee: International Business Machines Corporation, Armonk, N.Y.

[21] Appl. No.: 823,253

[22] Filed: Aug. 10, 1977

[51] Int. Cl.$^2$ .................. G01D 15/18; C03C 27/00; C03C 13/00
[52] U.S. Cl. .................. 346/140 R; 65/43; 106/50
[58] Field of Search .................. 346/75, 140; 65/43; 106/50, 52

[56] References Cited

U.S. PATENT DOCUMENTS

| | | | |
|---|---|---|---|
| 3,907,532 | 9/1975 | Roberts | 106/50 X |
| 3,957,342 | 5/1976 | Newns et al. | 106/50 X |
| 3,999,836 | 12/1976 | Wolf | 106/50 X |
| 4,011,060 | 3/1977 | Berkenblit et al. | 106/52 X |
| 4,019,886 | 4/1977 | Hoffman et al. | 65/43 |
| 4,054,472 | 10/1977 | Kondo et al. | 106/50 X |
| 4,062,689 | 12/1977 | Suzuki et al. | 106/50 |
| 4,062,690 | 12/1977 | Litherland et al. | 106/50 X |
| 4,063,001 | 12/1977 | Zlochower | 106/50 X |

Primary Examiner—George H. Miller, Jr.
Attorney, Agent, or Firm—Henry Powers

[57] ABSTRACT

The lifetime of multiple capillary nozzle assemblies embedded in a glass mass, of a multiple nozzle ink-jet printer, can be increased and the thermal and mechanical compatibility of the resulting package enhanced by fabrication of the nozzles from glass compositions comprised of $SiO_2$, $ZrO_2$, $Na_2O$, $K_2O$ and $MgO$. Inclusion of $ZrO_2$ as well as minor amounts of $BaO$, $MgO$, $CaO$, and $Al_2O_3$ enhances the alkali resistance of the glass nozzles. Also, the high $SiO_2$ content of the glasses combined with the presence of $ZrO_2$, $MgO$, $CaO$, and $Al_2O_3$ imparts an acid resistance to the nozzles.

5 Claims, 10 Drawing Figures

INK JET NOZZLE STRUCTURES

FIELD OF THE INVENTION

This invention relates to ink-jet printers and, more particularly, to nozzle compositions for use in ink-jet printers.

DESCRIPTION OF THE PRIOR ART

Co-pending application Ser. No. 640,138 of A. P. Hoffman et al. filed Dec. 12, 1975 (assigned to the assignee of this application), and which issued on Apr. 26, 1977 as U.S. Pat. No. 4,019,886, discloses and claims a multiple ink-jet array comprehended in this invention.

Also, the aforesaid Application Serial No. 640,138 sets forth an extended description of the prior art; and as pointed out therein, the fabrication of glass capillary tubes is known in the art, as amplified in accordance with the following. U.S. Pat. No. 3,294,504 to John W. Hicks, Jr., which issued on Dec. 27, 1966, is noted as disclosing the manufacture of glass fibers by assembling as many as ten thousand glass tubes 0.010 inch in diameter and one foot long into a bundle about one inch in diameter, which are fused into a composite assembly and sliced into wafers. U.S. Pat. No. 3,216,807 to Richard F. Woodcook, which issued on Nov. 9, 1965, discloses a process for fabricating fiber optical devices wherein the fiber optic elements are placed in a grooved block which serves as an alignment means.

Also pointed out in the art is a method for making nozzles used in ink jet recording. For example, U.S. Pat. No. 3,662,399 to Takao Yanoi, which issued on May 9, 1972, discloses the fabrication of such a nozzle which comprises a glass capillary over which a silicone coating is deposited. The coated capillary is then sliced to obtain a nozzle of desired length.

Reference is also made to a pending application entitled "Pre-Aimed Nozzle for Ink Jet Recorder and Method of Manufacture", Ser. No. 544,087, filed Jan. 27, 1975 (now abandoned), to D. F. Jensen, et al. which discloses the potting of a tube in a groove of a wafer block with soldered glass and the cutting of the block along planes perpendicular to the external location surfaces to obtain tubes precisely aimed relative to the wafer body.

Another pending application, "An Apparatus and A Method for Fabricating Precision Tubing and Ink Jet Nozzles", Ser. No. 573,233, filed Apr. 30, 1975 (now abandoned), to A. R. Hoffman et al. discloses a method and an apparatus for the batch fabrication of ink jet nozzles in which high pressure ink nozzles are fabricated by carefully controlled drawing of glass tubing.

Also pointed out as known is the fabrication of slot plates with precision and to convert plate assemblies into usable nozzle wafers. For example, U.S. Pat. No. 3,674,004 to Johannes Grandia et al., which issued on July 4, 1972, describes a precision cutting apparatus. The IBM Technical Disclosure Bulletin, Vol. 17, No. 7, Dec. 1974, p. 2171, discloses a precision lapping and polishing apparatus.

In ink jet recorders, liquid ink is supplied under pressure to a nozzle(s) having a very small opening through which an extremely fine, continuous jet of ink is projected. As disclosed previously, it has been found that ink jet nozzles made of glass can be used in such recorders.

Because the inks used in ink jet recorders are usually alkali or acid in nature, the glass comprising the nozzles must be corrosion resistant. Also, it has become recognized that the proper operation of such recorders depends very much upon the manner in which the nozzle is sealed to its surrounding surface. The area in the vicinity of the nozzle must be void-free and bubble-free to prevent leaking or breaking when the nozzle, in thin wafer form, is subjected to fluid pressure. Additionally, to prevent excessive stresses and/or cracking of any of the elements, especially when they are cut into thin wafers and lapped and polished for use in ink jet recorders, the thermal expansion characteristics of the fabricating elements must be carefully considered. In this respect, extreme caution is required in the fabrication of multi-nozzle arrays. Furthermore, the sealing operation must be performed in such a way as not to alter the nozzle size or shape or any previously sealed surfaces. None of the methods described in the above prior art provides a sealed nozzle array of this quality.

The use of multiple glass nozzles sealed in accordance with the invention of the aforesaid co-pending application Ser. No. 640,138 provides a particularly effective structural configuration of a nozzle-per-spot technology for use in ink jet recording. By providing parallel sealed glass nozzles of uniform size and area, velocity uniformity, break-off uniformity, directional uniformity and directional stability are achieved. Drilling holes in a block of ceramic or other material cannot provide such identical holes to meet all these requirements. Furthermore, it has been found that glass provides better nozzle size and area uniformity than silicon. Glass nozzles provide less wandering of fluid streams, that is, about 0.5–1.0 milliradians compared to some 3–8 milliradians for other kinds of nozzles. Locating such glass tubes side-by-side improves hole alignment uniformity, that is, about 0.1 mil in 2 inches compared to 3 mils in 2 inches for other kinds of nozzles.

In a preferred embodiment of the aforesaid application Ser. No. 640,138, a multiple ink-jet nozzle structure is described and claimed, in which ceramic or glass blocks are machined to form two plates of a desired smoothness and dimension, preferably in rectangular form. A single groove is formed the length of one side of the first plate, and cross-slots, deeper than the groove, are formed the width of the same side and intersecting the groove. Slots corresponding to the cross-slots in the first plate are formed the width of one side of the second plate. The groove holds a plurality of glass tubes which may be positioned before or after the two plates are joined. Each slot holds a sealant, such as glass cane, which is entered after the two plates are joined.

The joined plates with tubes and seal glass cane are then spring-clamped in an upright position on a support, and this entire assembly is then exposed to a temperature which is sufficient to melt only the glass cane, which will then flow by capillary and gravity action, through the groove to provide a complete seal for the tubes, specifically in the area between the cross-slots. After the sealing operation has been completed, the joined plates are gradually cooled and then the area between the slots is sliced into thin nozzle wafers. The presence of the cross slots guarantees uniform fill of the wafer section, reduces the longitudinal distance of seal glass flow and the area of the section cut, and serves as a vent to prevent air entrapment and thus voids, and as a means of introducing coolant as close as possible to the cutting device and wafer nozzles. After one side of the cut wafer undergoes lapping and polishing operations, it is ready for mounting on a back-up plate using techniques such as epoxy bonding, glass sealing or soldering. After mounting, the front side of the wafer is lapped and polished. The wafer thus mounted on the back-up plate is ready for connection to a source of high-pressure fluid.

In this approach, more than one pair of plates may be assembled and stacked vertically or placed at an appropriate angle and heated to provide the complete sealing of multiple rows of nozzle tubes. The entire assembly may be sealed, cut, lapped, polished and mounted to form a unit having multiple rows of nozzles.

Multiple ink-jet arrays designed for magnetic ink-jet printing (a technique utilizing neutral ink) have been successfully fabricated using the technique of the said co-pending application Ser. No. 640,138 employing Owens Illinois R-6 glass for the nozzle elements, and structurally the R-6 package has been quite successful. Unfortunately, there is only a limited need, at present, for magnetic nozzles.

However, multiple ink-jet arrays suitable for the more numerous electrostatic applications must use a corrosion resistant nozzle glass, and the said R-6 is rapidly corroded by highly alkaline electrostatic inks having a pH of 9.7–10.2, as well as in acidic inks having a pH of 6.2–6.9

Although glasses such as Corning's C-7280, and the like, are highly alkali resistant, their thermal properties present problems in fabrication of a structurally integrable package since there are no known seal glasses capable of producing a void-free seal around the C-7280 glass. The problem with the C-7280 glass is in the low thermal expansion ($\alpha_{20-300}$° C. = 62-64 × $10^{-7}$/° C.) coupled with its relatively low anneal temperature ($T_A$ = 627° C.).

The glass for sealing the nozzle elements to a substrate must have an expansion very near that of the nozzle glass at the set point of the seal glass and must also flow at a temperature near or below that of the anneal temperature ($T_A$) of nozzle glass composition. If, during sealing, the $T_A$ of the nozzle glass is significantly exceeded, the nozzles will deform and be useless. To date, no seal glasses capable of producing adequate flow at the temperature limitations imposed by the C-7280 glass, and yet matching this glass in expansion have been found.

Also, although acid resistant glasses are available, such as Corning's C-7740 (Pyrex), 96% silica, and fused silica, there are no available seal glasses for them. Although there are a number of suitable sealable glasses for the nozzle elements, such glasses, however, are excessively corroded by acidic and alkaline inks.

Therefore, no truly reliable ink-jet nozzle structure can be fabricated with existing glass materials that will sufficiently resist attack by alkaline and acidic inks.

SUMMARY OF THE INVENTION

It is an object of this invention to provide an improved glass ink-jet nozzle structure which may satisfy the exacting conditions described hereinabove.

It is another object of this invention to provide a new and improved glass composition adapted for use in the fabrication of ink-jet printing nozzles.

It is also an object of this invention to provide a new and improved glass composition for ink-jet nozzles which has increased resistance to corrosive inks employed in ink-jet printing operations.

A further object of this invention is to provide a glass composition resistant to corrosive inks and with thermal properties adapted for use in fabrication of glass ink-jet nozzle arrays for use in ink-jet printing operations.

A still further object of this invention is to provide a new and improved glass composition resistant to corrosive inks and having a high thermal expansion and a high anneal temperature adapted for use in fabrication of capillary nozzle elements for ink-jet printing applications.

A still further object of this invention is to provide a new and improved glass composition adapted for use in fabricating glass capillary nozzles for assembly into a multiple ink-jet nozzle array for ink-jet printing applications.

It is also an object of this invention to provide a new and improved glass composition for fabrication into ink-jet nozzles which can be encased with a glass mass into a multiple glass nozzle array for use in ink-jet printing operations.

In accordance with this invention, the basic thermal coefficient of expansion and anneal points in capillary ink-jet nozzle elements can be enhanced by their fabrication from a glass composition containing, by weight, from about 40 to about 60% $SiO_2$, from about 12 to about 20% $ZrO_2$, from about 12 to about 17% $Na_2O$, from about 0 to about 2.3% $K_2O$ and from about 0 to about 6% MgO.

Enhancement of the corrosion resistance of these glass nozzles against alkaline inks is obtained by the inclusion of $ZrO_2$, BaO, CaO, MgO, and $Al_2O_3$ to provide a glass composition containing, by weight, from about 42 to about 52% $SiO_2$, from about 8 to about 17% $ZrO_2$, from about 6 to about 14% $Na_2O$, from about 0 to about 2.3% $K_2O$, from about 0 to about 6% MgO, from about 0 to about 5% $B_2O_3$, from about 4 to about 6% $Al_2O_3$, from about 3 to about 22.3% BaO, from about 6.7 to about 9.7% CaO, from about 0 to about 2% $Li_2O$ and from about 0 to about 7% $Cu_2O$.

Alternatively, the corrosion resistance of the glass nozzles against acidic inks can be enhanced by the inclusion of $ZrO_2$, CaO, MgO, and $Al_2O_3$ in a glass composition comprising, by weight, from about 35 to about 58.5% $SiO_2$, from about 17 to about 22.5% $ZrO_2$, from about 16 to about 17% $Na_2O$, from about 2 to about 3% $K_2O$, from about 3 to about 5% MgO, from about 0 about 1% $Al_2O_3$, from about 0 to about 2.5% CaO and about 0.5% $As_2O_3$.

Other objects, features and advantages of the invention will become apparent from the following description of the drawings.

DESCRIPTION OF THE PREFERRED EMBODIMENTS

In illustration of this invention, a description of an embodiment of the aforesaid co-pending Application Serial No. 640,138 is set forth to exemplify the type of structures comprehended in this invention.

Figure 1A:
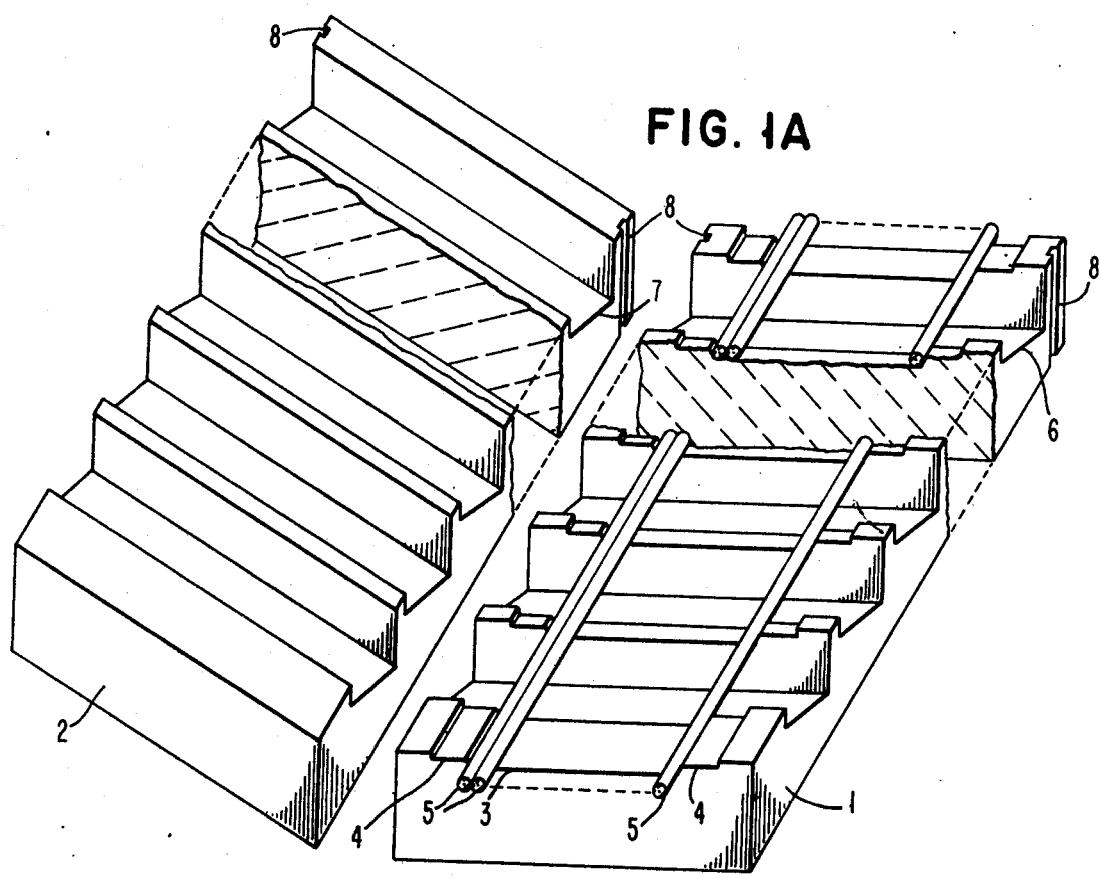
FIGS. 1A and 1B show a plate configuration employed in fabrication of a multiple ink-jet array for illustration of this invention.

As shown in FIG. 1A, a plate assembly is illustrated for the fabrication of multiple nozzle arrays. Plates 1 and 2, preferably of the same material (e.g. glass or ceramic) and surface area, are machined to provide parallel, deep, trapezoidal-type slots 6 and 7 along one surface thereof. Plate 1 is further machined to provide a single wide groove 3 and smaller grooves 4. Groove 3 must be wide enough to permit a plurality of capillary glass orifice elements or tubes 5, of this invention, to be placed snugly side by side across the entire length of the groove surface. Groove 3 may also be slightly tapered in the corners or have undercuts in the inside corners. Smaller grooves 4 may take any dimension to assure a flow of a first sealing glass between the plates to guarantee a bond between plates 1 and 2. Grooves 8 provide for alignment of the plates when assembled.

Figure 1B:
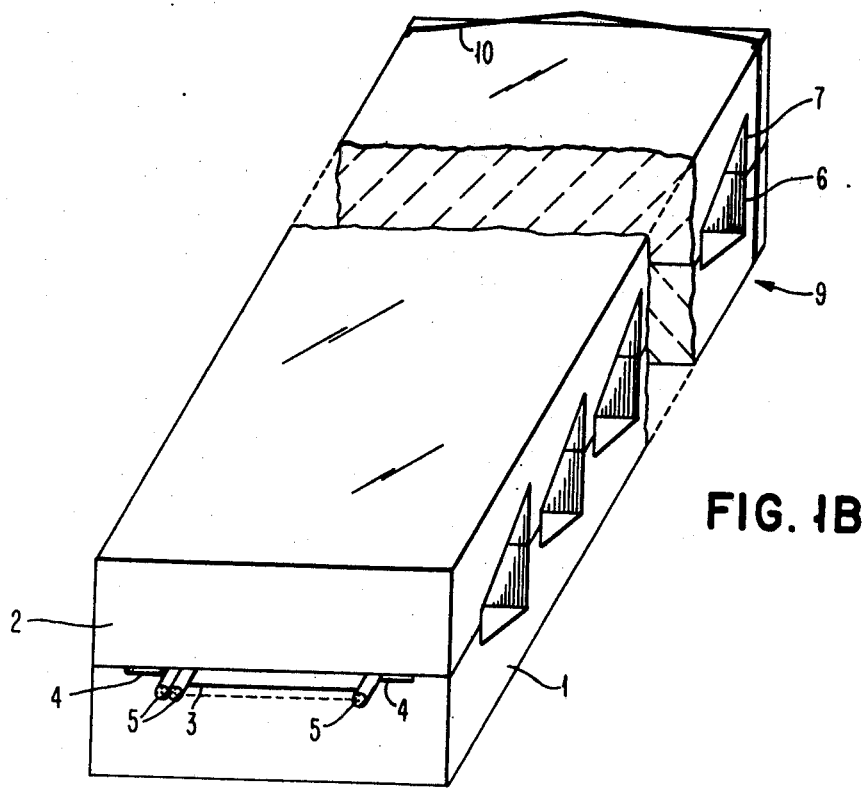

FIG. 1B shows plates 1 and 2 joined to form a plate assembly 9. It will be noted that slots 6 and 7 are prefectly aligned by wire 10 in groove 8. The wire is made of heat resistant material, e.g., tungsten. Such alignment is necessary since the area between each adjacent pair of slots will later be cut to form the multiple nozzle wafers. At this time, the plates are joined, but not sealed, and the capillary glass tubes 5 are shown resting loosely in groove 3.

Figure 2:
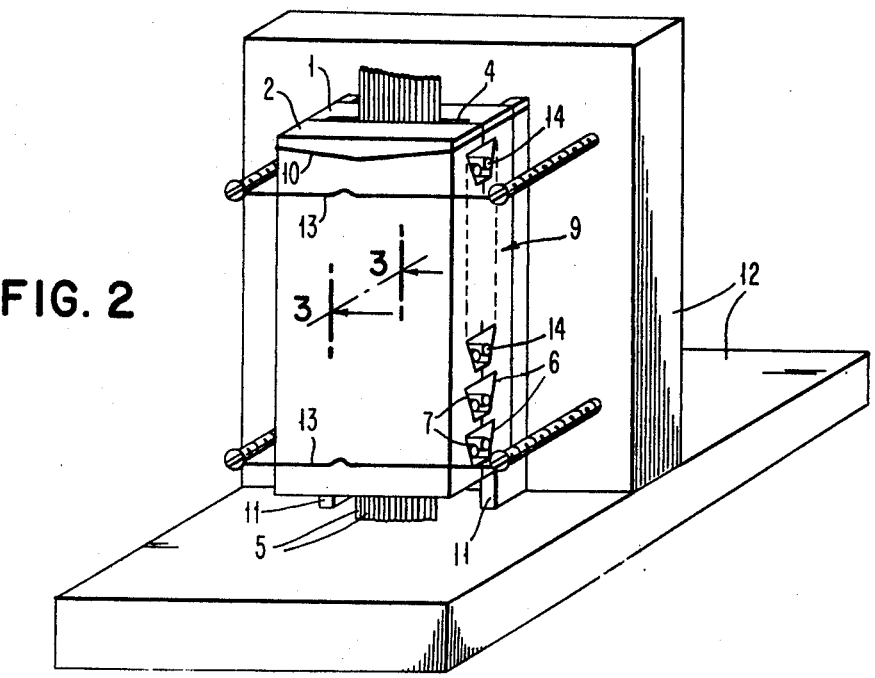
FIG. 2 illustrates a stage in the fabrication of a multiple ink-jet nozzle array encased within a glass mass.

FIG. 2 shows a plate assembly 9 held upright on platform 11 of fixture 12 by springs 13. This arrangement permits ideal downward melt flow of a first glass seal or cane 14 when the assembly and support are placed in a furnace and heated. The glass tubes are shown extended beyond the lower portion of the assembly to prevent possible orifice blockage caused by melt flow up the tubes due to capillary action. The springs 13 which are made of a heat resistant material, e.g. tungsten, provide only sufficient pressure at the center of the assembly, to keep the plates from separating and to hold the plates in the support. This is shown accomplished by the connection of the springs to elements, e.g. screws, extending from the fixture.

Figure 3:
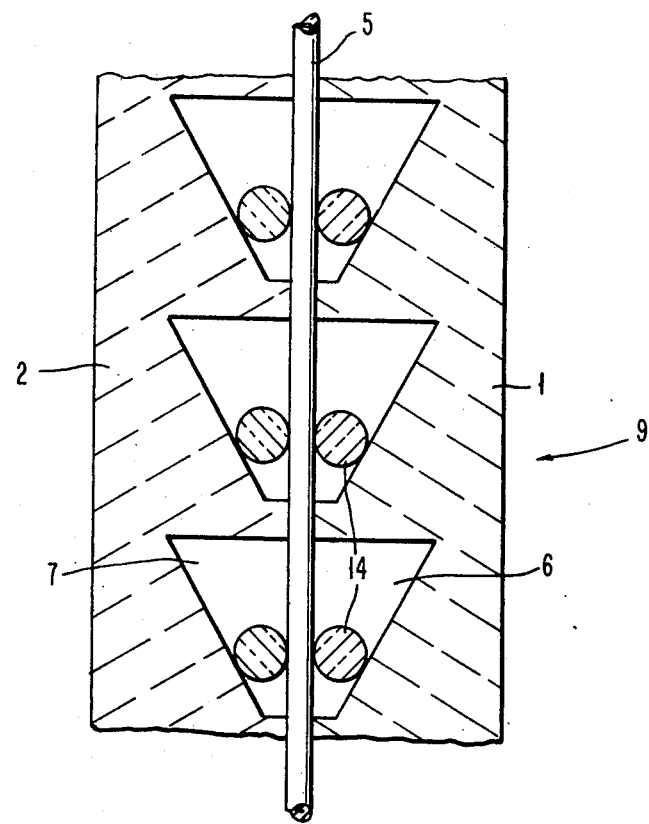
FIG. 3 is a sectional view taken along line 3—3 of FIG. 2.

FIG. 3 shows a partial cross-sectional view, taken along lines 3—3 of assembly 9 of FIG. 2. It will be seen that the trapezoidal-type slots on both sides of glass tube 5 permit the glass seal or cane 14 to rest snugly against the glass tube on both sides and, therefore, when melted, to flow freely, due to capillary and gravity action, to cause the glass area between each upper slot and lower slot to seal in a void and bubble free manner.

Figure 4:
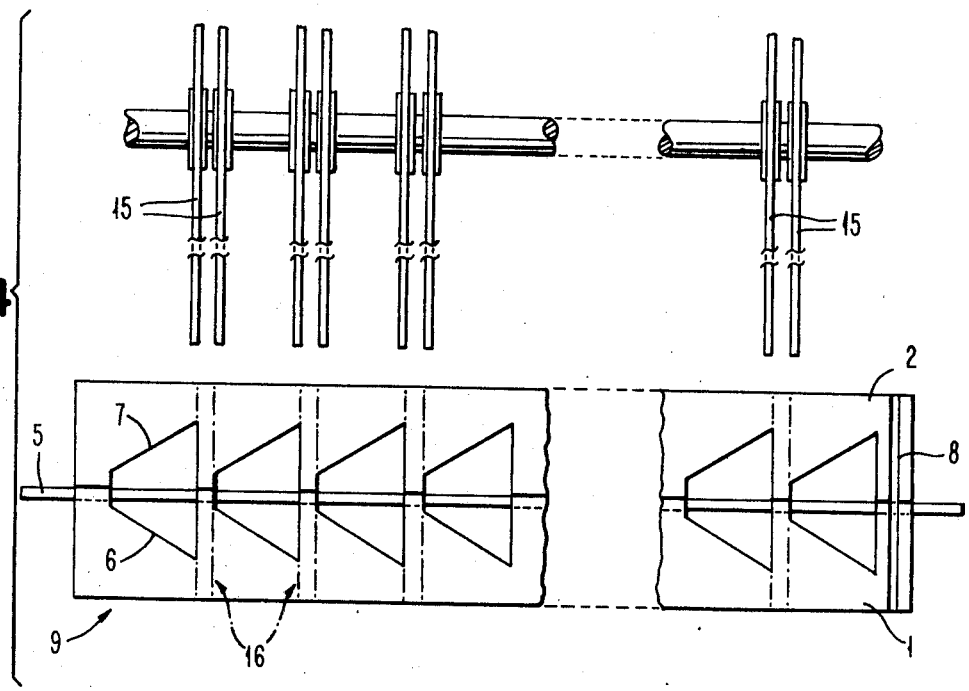
FIG. 4 illustrates another stage in the fabrication of a plurality of wafers containing a multiple ink-jet nozzle array.

FIG. 4 illustrates one way in which plate assembly 9 may be cut after the sealing operation, wherein a plurality of uniformly spaced sawing elements 15 are moved relative to the plate assembly 9. The assembly, mounted on a fixture of a gang sawing machine, is fed parallel with the plane of the saws while cutting takes place. While rotary saws are shown, reciprocating blade saws can also be used. It should be understood that wafers can also be cut singly in accordance with accepted techniques, although simultaneous cutting of the wafers 16 with a gangsaw arrangement is preferred, since it produces more uniform thickness throughout the length of the wafer. In the disclosed arrangement which forms a part of the invention, the cross slots 6 and 7 reduce the area of the section cut and serve as a means for introducing an appropriate coolant as close as possible to the saw blades and the glass tubes. This assures a cutting operation without tube or seal glass damage.

Figure 5:
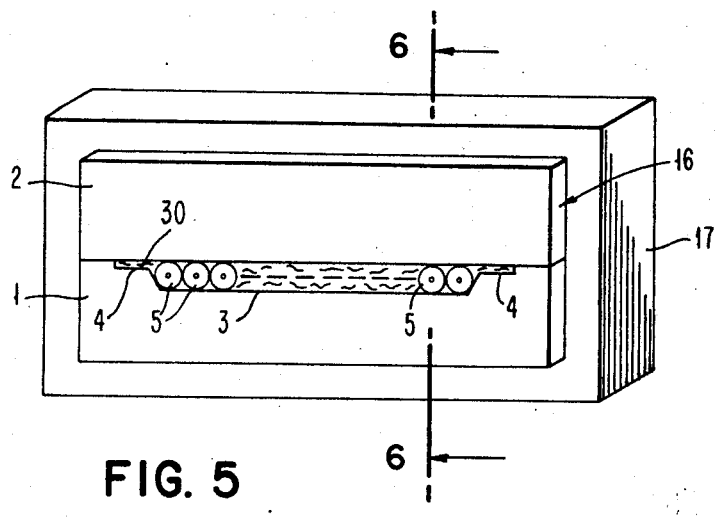
FIG. 5 illustrates a wafer containing a multiple ink-jet nozzle array mounted on a back-up plate for an ink-jet printer.

FIG. 5 shows a typical wafer 16 with the formed glass melt or seal 30 in grooves 3 and 4 which fully seals the tubes and provides a bond between the plates. After a wafer is cut, there are performed precision lapping and polishing operations that are known, e.g. see the IBM Technical Disclosure Bulletin, December 1974, Vol. 17, No. 7, p. 2171. After one side of the wafer 16 has been suitably lapped and polished, it is mounted, as shown in FIG. 5, on back-up plate 17 to form the head of an ink jet recording apparatus. The back-up plate should preferably be the same material, i.e. ceramic or glass, as the wafer, although this is not mandatory. As for the mounting operation, this may be done by applying a thin coating of glass solder or epoxy at least on that portion of the back-up plate coextensive with the dimensions of the wafer and entirely around the passageway opening. With the wafer properly aligned on the plate, it is heated, thereby causing the solder glass or epoxy to be molten and, when cooled, to bond the wafer to the back-up plate. After mounting, the front side of the wafer is lapped and polished.

Figure 6:
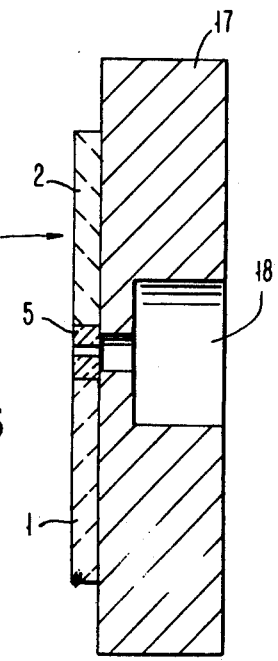
FIG. 6 is a cross-sectional view taken along lines 6—6 of FIG. 5.

FIG. 6 illustrates a partial cross-sectional view of the mounted wafer 16, taken along lines 6—6 of FIG. 5, with proper alignment of the glass tube 5 and opening 18 of back-up plate 17. The opening in the back-up plate adjacent the wafer is larger than the glass tube opening but smaller than the annular diameter of the tube so that a fluid-tight seal is obtained to assure that when pressurized fluid is supplied to the plate, leakage will not occur around the tube.

Figure 7:
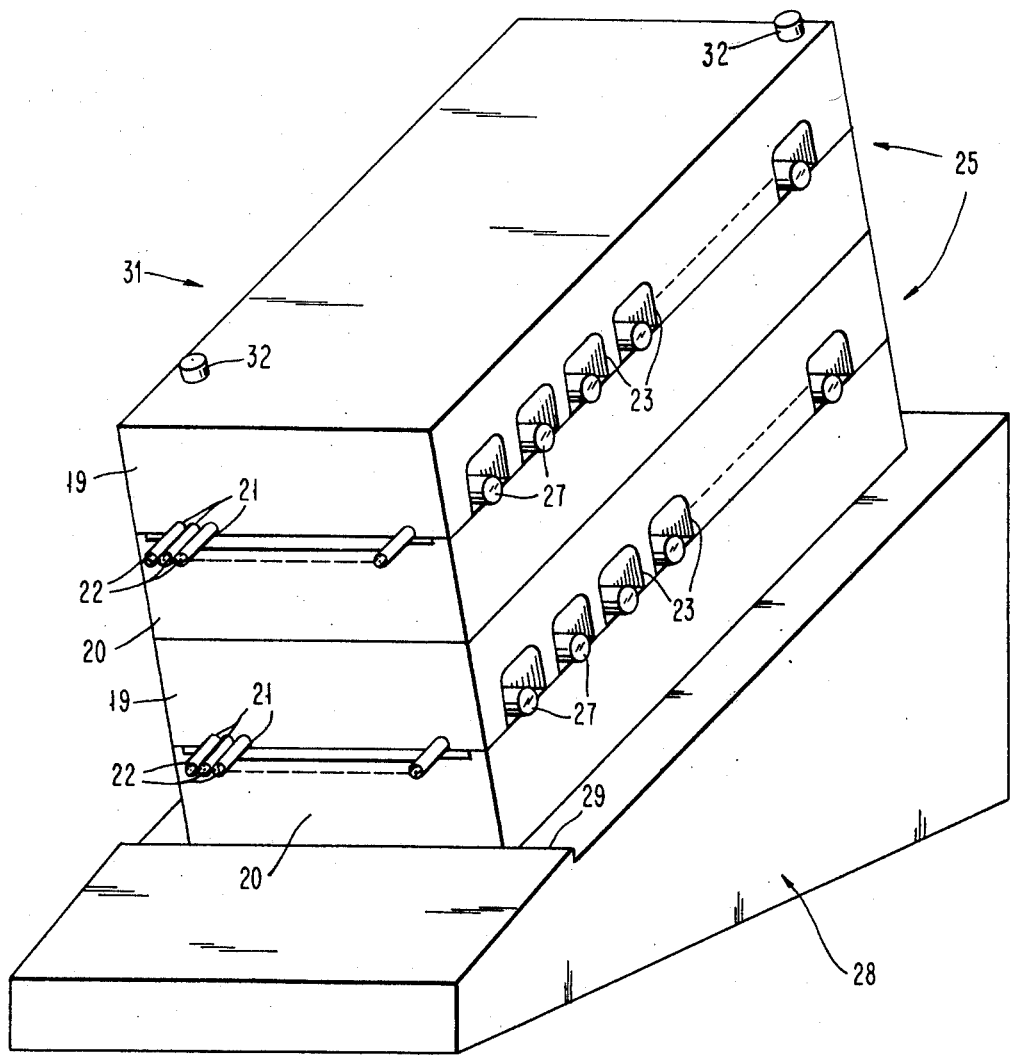
FIG. 7 shows a variation of a nozzle plate assembly of FIG. 1B mounted for heating and sealing operations.

FIG. 7 illustrates another embodiment of the inventive apparatus in which a large assembly 31 comprises two plate assemblies 25 which may be held together by ceramic dowels 32 or some other registration means. Assembly 31 is also shown on support 28 restrained by edge 29. It will be noted that in this configuration, two rows of glass tubes may be sealed. However, more than two rows of tubes may be formed, the rows may be staggered or the number of tubes may vary between rows. It should also be understood that it is possible to use other combinations of plate assemblies with greater or fewer numbers of grooves and cross-slots in accordance with one's wishes or needs.

After either plate assembly 25 or 31 with support 28 is placed in a furnace, the glass cane is melted and flows by capillary and gravity action through the tube carrying grooves to provide a void and bubble-free seal. The assembly is gradually cooled and then sliced, in the manner shown in FIG. 4, to form nozzle wafers of that portion of the assembly between adjacent ones of the canecarrying slots.

The first essential in carrying out the method of this invention is to select the right match of materials for the sealant, tubes and plates. The selection of materials of improperly matched thermal properties, such as anneal points "$T_A$", flow points "$T_F$", and thermal expansion coefficient "α" would contribute to excess of stresses and/or cracking of one or more of these elements, especially in the final stage, when the temperature is lowered from the set point of the seal glass to room temperature. Also, the materials must be such that they can be simultaneously machined, lapped and polished with the same coolant, wheel or abrasive at a single feed and speed rate.

Accordingly, in order to fabricate economical and durable multi-array glass ink-jet nozzle packages for use with corrosive electrostatic inks in high speed inkjet printing, sealable and high corrosion-resistant nozzle glasses must be used in conjunction with any of known and available seal glasses, as well as various known ceramics and glasses for use as plate structures in the fabrication of the multi-nozzle arrays. Typical composition for use as glass sealants are a glass comprised, in weight percent, of 58% PbO, 19.5% $B_2O_3$, 11% $SiO_2$, 4% $Al_2O_3$, 2.5% MgO, 4% ZnO, and 1% $Na_2O$ (herein referred to as S-230) and an admixture of 90 wt.% of Owens Illinois SG-67 glass with 10 wt.% of Owens Illinois SG-7 glass (herein referred to as S-69). In general, these glasses at their point will be characterized with a coefficient of thermal expansion, "α", essentially that of the nozzle glasses, and a flow temperature below the anneal temperature "$T_A$" of the nozzle glasses. The choice of materials available for use as the plate structure in fabricating the nozzle array include Forsterite 243 of the Minnesota Mining and Manufacturing Co., Corning's machinable glass ceramic C9658, as well as the nozzle glass compositions of this invention.

Table I below sets out a series of specific embodiments of glass compositions (A-xxx series) high in alkali resistance which have favorable thermal properties of high expansion coefficients "α" coupled with high anneal temperatures "$T_A$" and favorable softening temperatures "$T_S$". In Table I, both compositions (by weight percent) and thermal properties of nozzle glass compositions are compared with commercial C-7280 and C-7740 glasses.

TABLE II

| Oxide | Wt.% |
| --- | --- |
| $SiO_2$ | 42.5 – 51.5 |
| $B_2O_3$ | 0 – 5.0 |
| $Al_2O_3$ | 4.0 – 6.0 |
| $ZrO_2$ | 8.0 – 17.0 |
| BaO | 3.0 – 23.3 |
| CaO | 6.7 – 9.7 |
| MgO | 0 – 6.0 |
| $Na_2O$ | 6.0 – 14.0 |
| $K_2O$ | 0 – 2.3 |
| $Li_2O$ | 0 – 2.0 |
| $Cu_2O$ | 0 – 2.0 |

As can be seen from Table I, most of the A-xxx series glasses have anneal temperature essentially equal to or greater than that of C-7280. All of the A-xxx series glasses have expansion coefficients significantly higher than that of C-7280.

Table I also gives the durability of the various glasses with respect to an alkaline electrostatic ink with a pH of 9.7. All glasses were exposed to the ink for at least 24 hours, and the degree of corrosion was accelerated during heating by increasing the ink temperature from 25 to 70° C. By using small rods of the glass, the surface area exposed to the ink was greatly increased. These rods were characterized with a diameter of 0.042 inches. A 24 hour test of this nature was found to be equivalent to a 300 hour test on an equal amount of glass tested as a single mass. In some cases, testing was continued to 500 hours with weight loss determinations made at 100 hour intervals.

Also set out in Table I is an ink resistant quotient (IRQ) which compares ink resistance of each glass relative with that of C-7280.

The data of Table I shows that a glass such as the optimum A-190 not only has thermal properties that are far superior than that of C-7280 for ink jet nozzles, but is also more resistant to the alkaline ink than C-7280.

Table I also shows the corrosion resistance of the glasses in an acidic electrostatic ink having a pH of 6.25. In acid conditions, C-7740 (Pyrex) glass has long been

TABLE I

| Oxide | A-165 | A-178 | A-182 | A-190 | A-200 | A-209 | A-211 | A-214 | A-221 | (Pyrex) C-7740 | C-7280 |
| --- | --- | --- | --- | --- | --- | --- | --- | --- | --- | --- | --- |
| $SiO_2$ | 42.5 | 42.5 | 51.5 | 42.5 | 42.5 | 43.0 | 42.5 | 46.5 | 44.5 | 81.0 | 71.0 |
| $B_2O_3$ | — | 2.0 | 5.0 | 2.0 | 2.0 | — | — | 2.0 | 1.0 | 13.0 | — |
| $Al_2O_3$ | 5.5 | 5.5 | 6.0 | 5.5 | 5.5 | 4.0 | 5.5 | 4.5 | 5.0 | 2.0 | 1.0 |
| $ZrO_2$ | 12.0 | 13.0 | 8.0 | 13.0 | 13.0 | 13.5 | 13.5 | 17.0 | 15.25 | — | 15.0 |
| BaO | 23.3 | 14.0 | 8.5 | 14.0 | 12.0 | 14.0 | 12.0 | 3.0 | 7.5 | — | — |
| CaO | 6.7 | 6.7 | 6.7 | 7.7 | 8.7 | 8.2 | 8.7 | 7.7 | 8.2 | — | — |
| MgO | — | 3.0 | 3.0 | 4.0 | 5.0 | 5.0 | 4.0 | 4.0 | 4.0 | — | — |
| $Na_2O$ | 10.0 | 10.0 | 6.0 | 10.0 | 10.0 | 11.0 | 11.5 | 14.0 | 12.75 | 4.0 | 11.0 |
| $K_2O$ | — | 1.3 | 1.3 | 1.3 | 1.3 | 1.3 | 2.3 | 1.3 | 1.8 | — | 0.5 |
| $Li_2O$ | — | — | 2.0 | — | — | — | — | — | — | — | 1.0 |
| $Cu_2O$ | — | 2.0 | 2.0 | — | — | — | — | — | — | — | — |
| $\alpha_{20-300}$ /°C × $10^{-7}$ | 92.8 | 88.0 | 79.6 | 88.1 | 89.8 | 92.3 | 94.4 | 91.1 | 92.9 | 33.0 | 64.0 |
| $T_A$ °C | 645 | 588 | 523 | 620 | 623 | 627 | 630 | 634 | 626 | 565 | 627 |
| $T_S$ °C | 805 | 769 | 687 | 791 | 792 | 792 | 804 | 804 | 799 | 820 | 867 |
| ALKALINE INK RESISTANCE pH 9.7 | | | | | | | | | | | |
| wt.loss** mg/cm² | 0.0444 | 0.0378 | 0.0452 | 0.0219 | 0.0405 | 0.0307 | 0.0313 | 0.0129 | 0.0311 | 0.2878 | 0.0296 |
| IRQ | 1.50 | 1.28 | 1.53 | 0.74 | 1.37 | 1.04 | 1.06 | 0.44 | 1.05 | 9.72 | 1.00 |
| ACIDIC INK RESISTANCE pH 6.25 | | | | | | | | | | | |
| wt.loss** mg/cm² | 0.0146 | 0.0087 | * | 0.0071 | * | 0.0092 | 0.0105 | 0.0104 | 0.0064 | 0.0046 | 0.0091 |
| IRQ | 3.17 | 1.89 | * | 1.53 | * | 1.99 | 2.27 | 2.26 | 1.39 | 1.00 | 1.97 |

*Not determined
**24 hour accelerated

Table I defines the following compositional ranges for the A-xxx series of nozzle glasses of this invention.

one of the best. However, the thermal properties of the Pyrex glass ($\alpha_{20-300}$ = 33 × $10^{-7}$/° C., $T_A$ = 565° C.) are even worse than those of C-7280, and even to date, no satisfactory seal glass for the Pyrex composition can be found. A glass that is suitably resistant to acidic inks is also desired.

Table I sets forth the acid resistance of the various glasses with ink resistant quotient (IRQ) of the A-xxx series glasses compared with that of Pyrex (C-7740). From this data, it can be seen that a glass such as A-190, while not as resistant to acid as the C-7740 is, however, in close proximity.

Glasses of the A-190 type have several features that make them particularly suitable for use in fabrication of nozzles in alkaline or acidic elctrostatic ink-ject printing application. Among these features are the (a) corrosion resistance of the A-190 type glasses is better than that of C-7280 in alkaline inks and near that of C-7740 in acidic inks. The C-7280 glass is generally considered to be the best alkaline resistant commercial glass known, and (b) the thermal properties of the A-190 type glasses are such that any number of glasses can be used for sealing purposes. For example, these can comprise a lead containing glass with a $(\alpha_{20\text{-}S.P.} = 88 \times 10^{-7}/°C.)$, and $T_S = 462°$ C., can be formulated from 90 wt.% of Owens Illinois SG-67 with 10 wt.% of Owens Illinois SG-7.

The general range of these alkaline resistant A-xxx series glasses are set forth in Table II, which basically comprise an alkali silicate with additions of $ZrO_2$, BaO, CaO and MgO.

Table III sets forth various zirconium containing glass compositions, for ink-jet nozzles, which exhibit very significant low rates of corrosion in acidic electrostatic inks, e.g. pH 6.2 to 6.9, which glasses also have excellent thermal properties which make them very compatible with available seal glasses in terms of sealability and stability. Table III sets forth a comparison of a series of A-xxx glasses chemical composition (by wt.%), thermal properties and weight in an acidic ink with a pH of 6.25 relative with corresponding properties of one of the best known commercial acid resistant glasses (e.g. C-7740, Pyrex), as well as with Kimble's R6 glass.

As seen from Table III, the resistance of the C-7740 glass (Pyrex) to corrosion by low pH inks is extremely high, but in view of the low expansion characteristics $(\alpha_{20\text{-}300} = 33 \times 10^{-7}/°C.)$ of this glass, it has been found to be incompatible with the ink-jet nozzle fabrication technique of the aforesaid copending Application Ser. No. 640,138.

Figure 8:
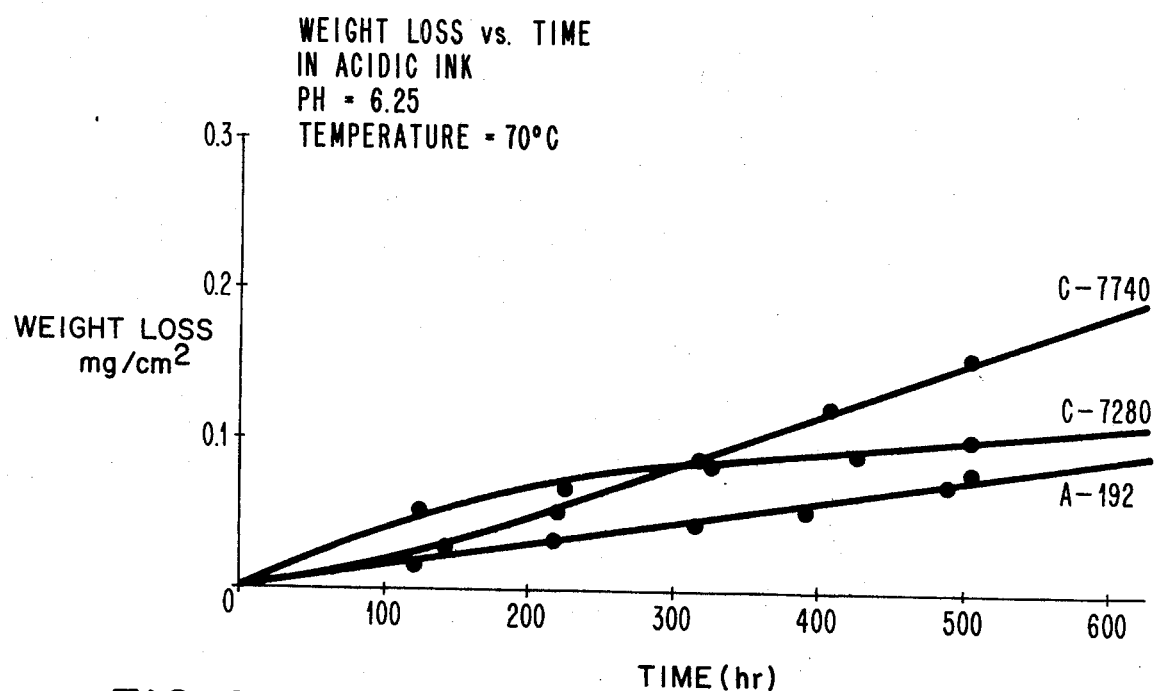
FIG. 8 is a graph illustrating the weight loss data of one embodiment of a glass composition in a corrosive ink of low pH.

Conversely, however, as can be seen from Table III, the A-192 type of glass exhibits high thermal properties of $\alpha$ and $T_A$, as well as a weight loss in low pH ink which is closely proximate to that of the Pyrex C-7740 after 24 hours testing. With continued testing in such ink the A-192 glass, as shown in FIG. 8, actually loses less weight than does the C-7740. In this figure, it is also noted that the A-192 glass has better resistance to an acidic ink than does the C-7280 glass.

Figure 9:
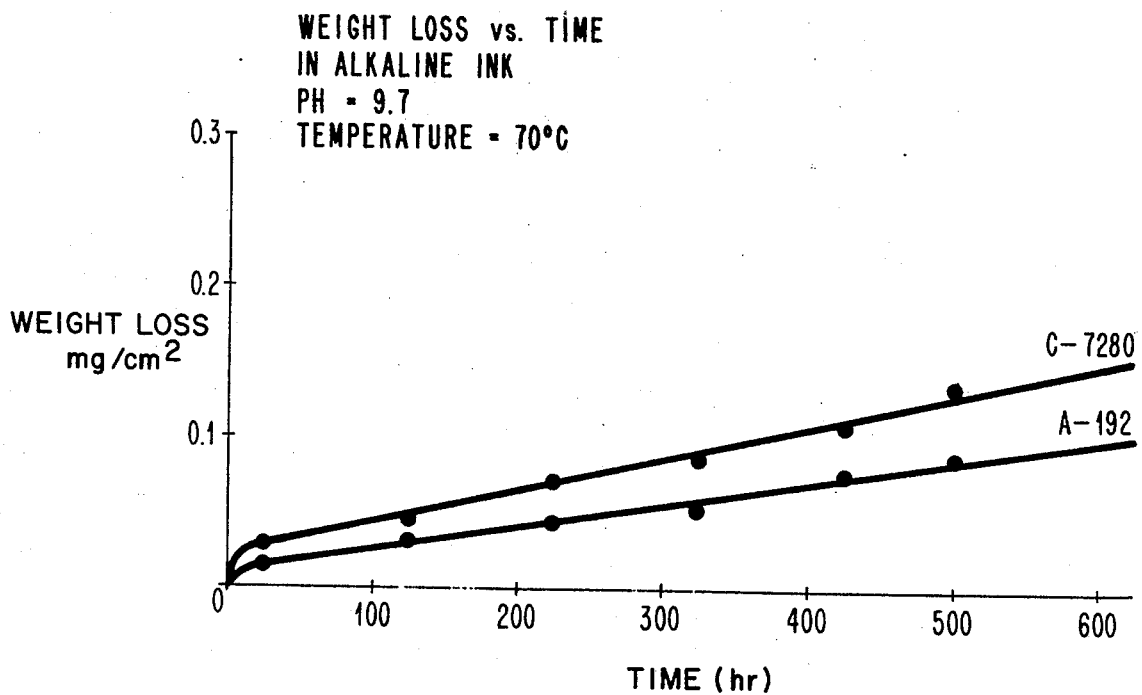
FIG. 9 is another graph illustrating the weight loss data of one embodiment of a glass composition in a corrosive ink of high pH.

In FIG. 9, the superiority of the A-192 glass over the C-7280 glass in an alkaline ink is shown.

Ink jet nozzles can be fabricated in a multiple nozzle array in combination with sealants and plates as shown in Table V below.

TABLE V

| Nozzle Glass | Sealant Glass | Plates |
|---|---|---|
| A-192 | S-230 | A-192 |
| A-192 | S-215 | A-192 |
| A-192 | S-240 | A-192 |
| A-192 | S-225 | C-9658 |
| A-190 | S-69 | A-190 |

Compositions of "S" Glasses (Wt.%)

|  | PbO | $B_2O_3$ | $SiO_2$ | $Al_2O_3$ | MgO | ZnO | $Na_2O$ |
|---|---|---|---|---|---|---|---|
| S-230 | 58.0 | 19.5 | 11.0 | 4.0 | 2.5 | 4.0 | 1.0 |
| S-215 | 63.0 | 20.5 | 7.0 | 4.0 | 2.5 | 3.0 | — |
| S-225 | 94 w/o SG-67* + w/o SG-7* | | | | | | |
| S-240 | 88 w/o SG-67 + 12 w/o SG-7 | | | | | | |
| S-69 | 90 w/o SG-67 + 10 w/o SG-7 | | | | | | |

*Commercial seal glasses of Owens Illinois Inc.

Properties of "S" Glasses

TABLE III

| Wt.% Oxide | A-192 | A-196 | A-213 | A-210 | A-204 | R-6 | C-7740 |
|---|---|---|---|---|---|---|---|
| $SiO_2$ | 58.5 | 58.5 | 55.0 | 55.0 | 55.0 | 73.6 | 81.0 |
| $Al_2O_3$ | — | 1.0 | — | — | — | 1.0 | 2.0 |
| CaO | — | — | — | 1.5 | 2.5 | 5.2 | — |
| $ZrO_2$ | 19.0 | 17.0 | 22.5 | 20.0 | 19.0 | — | — |
| $Na_2O$ | 16.0 | 17.0 | 16.0 | 17.0 | 16.0 | 16.0 | 4.0 |
| MgO | 4.0 | 3.0 | 4.0 | 4.0 | 5.0 | 3.6 | — |
| $K_2O$ | 2.0 | 3.0 | 2.0 | 2.0 | 2.0 | 0.6 | — |
| $As_2O_3$ | 0.5 | 0.5 | 0.5 | 0.5 | 0.5 | — | — |
| $B_2O_3$ | — | — | — | — | — | — | 13.0 |
| $\alpha_{24\text{-}300°C} \times 10^{-7}/°C$ | 88.1 | 79.2 | 87.8 | 91.2 | 90.4 | 93.0 | 33.0 |
| $T_A$ ° C | 673 | 630 | 710 | 665 | 650 | 525 | 565 |
| $T_S$ ° C | 883 | 839 | 903 | 862 | 842 | 700 | 820 |
| Loss* (mg/cm²) | 0.0053 | 0.0053 | 0.0086 | 0.0096 | 0.0147 | 0.0105 | 0.0046 |

*24 hour corrosion test at 70° C, as described above, in acidic ink pH 6.25.

Table III defines the following compositional ranges for this A-xxx series of nozzle glasses of this invention.

TABLE IV

| Oxide | Wt.% |
|---|---|
| $SiO_2$ | 55.0 – 58.5 |
| $Al_2O_3$ | 0 – 1.0 |
| CaO | 0 – 2.5 |
| $ZrO_2$ | 17.0 – 22.5 |
| $Na_2O$ | 16.0 – 17.0 |
| MgO | 3.0 – 5.0 |
| $K_2O$ | 2.0 – 3.0 |

TABLE IV-continued

| Oxide | Wt.% |
|---|---|
| $As_2O_3$ | 0.5 |

|  | S-215 | S-230 | S-225 | S-240 | S-69 |
|---|---|---|---|---|---|
| $\alpha_{20\text{-}300} \times 10^{-7}/°C$ | 76 | 74 | 79 | 75 | 75 |
| $T_A$(° C) | 436 | 440 | 368 | 371 | 365 |
| $T_s$(° C) | 514 | 525 | 446 | 450 | 441 |

The first step in fabrication of the nozzle arrays is to obtain precision glass tubing of appropriate length and opening. The length raises no problems. As for the opening, it has been found that the most desirable ink jet stream for recording is produced when the aspect ratio of the tube opening, i.e. the ratio of the diameter to the length of the opening is very small, for example, in the order of less than five. The diameter of a nozzle is selected in accordance with the desired application. For example, the size of the nozzle in general applications has an inner diameter of about 10–75 microns, while the outer diameter is from 100–1500 to microns. To obtain uniformity of print and directional stability, the opening of the eight jet nozzles must be controlled to a tolerance as close as ±.5 microns. This may be as close as ±.25 microns for the uniformity of an array. The need for a uniform, small tube opening coupled with the wafer thickness makes the fabrication process difficult and underscores the importance of the sealing operation. The final array must also be leak proof and chemically compatible with the ink.

Once the materials are selected, the three principal elements (tubes, sealant, plates) are formed in a size and configuration to meet one's multiple nozzle wafer requirements. Referring to FIGS. 1–6, slots 7 are machined in plate 2 and a single groove 3 and cross-slots 6, which correspond to slots 7, are formed in plate 1. Glass tubes 5 are placed the length of groove 3 and snugly in the groove. The two plates 1 and 2 are then joined so that slots 6 and 7 are exactly aligned and such alignment is retained by wire 13. The plate assembly 9 is then placed in an upright position on platform 11 of fixture 12 and restrained by springs 13. Glass cane 14 is positioned in each slot 6 and 7 and will automatically come to rest on both sides of each glass tube 5.

The entire assembly, with glass cane and glass tubes in position, is now ready for heating. It is placed in a furnace and then heated to a temperature which causes the glass cane 14 alone to melt and to flow, by capillary and gravity action, through the groove 3 and small groove 4 to complete the encapsulation of tubes 5 and the sealing of the two plates 1 and 2. Heating is continued for a period of time sufficient to enable the molten glass in the cross-slots to fill the groove space not occupied by the tubes. The temperature must be minimized to preserve the holes in the tubes (preferably near the anneal temperature of the nozzle material), and must be maximized to reduce the viscosity of the seal glass to the point where good flow and complete filling of the joint occurs.

A typical furnace cycle for materials combinations A-192, S-230 and A-192 plates of Table V above is shown below:

|  | (a) | (b) | (c) |
|---|---|---|---|
| TEMPERATURE | 670° C | 530° C | 450° C |
| TIME | 30 min. | — | — |

Temperature level (a) is obtained gradually at about 5° C./min. Temperature level (a) is lowered gradually, about 5° C./min., to level (b). A slower approach, about 1°–2° C./min. is used to proceed from level (b) to level (c), just about the anneal point temperature of the seal glass. The return to room temperature from level (c) proceeds at about 0.25°–0.5° C./min.

A typical furnace cycle for materials combinations A-190, S-69 and A-190 plates of Table V above is shown below:

|  | (a) | (b) | (c) |
|---|---|---|---|
| TEMPERATURE | 600° C | 440° C | 370° C |
| TIME | 30 min. | — | — |

The same gradual temperature changes apply here, with for example, the return to room temperature from level (c), the anneal point temperature of the seal glass, proceeding at about 0.25–0.5° C./min. In order to obtain a minimum set point, it may also be desirable to hold the assembly for a period of several hours at a chosen temperature between the seal glass strain and anneal temperatures, such as 5° C. above the strain point temperature.

After the plate assembly 9 is returned to room temperature, with the two plates and all the tubes completely sealed, it is sliced as shown in FIG. 4. Each adjacent pair of saw blades are adjusted to cut through adjacent slots 6 and 7, in this way permitting the blades to be acted upon by some inserted coolant material. After the multiple nozzle wafer 16 is cut, it is mounted, in alignment, on a back-up plate 17, which is then attached to a source of high pressure fluid.

The steps for developing multiple nozzle wafers in the second embodiment are the same once the plate assembly, having a cross-slotted plate and a flat plate, is formed and placed on an inclined plane fixture. In this case, seal glass cane is only required on one side of the tubes since it can flow in the space between the tubes to seal completely the opposite side from the cane slot.

While the invention has been particularly described in reference to preferred embodiments thereof, it will be understood by those skilled in the art that the foregoing and other changes in form and details may be made therein without departing from the spirit and scope of the invention.

What is claimed is:

1. A multiple nozzle assembly for use in ink-jet printers comprising a plurality of coextending glass nozzles embedded in a glass mass, with the composition of said nozzles comprising, by weight
   40–60%: $SiO_2$
   12–20%: $ZrO_2$
   12–17%: $Na_2O$
   0–2.3%: $K_2O$ and
   0–6%: $MgO$ 2. The nozzle assembly of claim 1 wherein said glass nozzle composition comprises, by weight,
   42–52%: $SiO_2$
   8.0–17.0%: $ZrO_2$
   6.0–14.0%: $Na_2O$
   0–2.3%: $K_2O$
   0–6.0%: $MgO$, and including, by weight,
   0–5%: $B_2O_3$
   4.0–6.0%: $Al_2O_3$
   3.0–22.3%: $BaO$
   6.7–9.7%: $CaO$
   0–2.0%: $Li_2O$ and
   0–2.0%: $Cu_2O$ 3. The nozzle assembly of claim 2 wherein said glass nozzle composition comprises, by weight, about
   42.5%: $SiO_2$
   12%: $ZrO_2$
   10%: $Na_2O$
   5.5%: $Al_2O_3$
   23.3%: $BaO$
   6.7%: $CaO$ 4. The nozzle assembly of claim 2 wherein said glass nozzle composition comprises, by weight, about
 42.5%: $SiO_2$
 13.0%: $ZrO_2$
 10.0%: $Na_2O$
 1.3%: $K_2O$
 3.0%: $MgO$
 2.0%: $B_2O_3$
 5.5%: $Al_2O_3$
 14.0%: $BaO$
 6.7%: $CaO$
 2.0%: $Cu_2O$ 5. The nozzle assembly of Claim 2 wherein said glass nozzle composition comprises, by weight, about
 42.5%: $SiO_2$
 13.0%: $ZrO_2$
 10.0%: $Na_2O$
 1.3%: $K_2O$
 4.0%: $MgO$
 2.0%: $B_2O_3$
 5.5%: $Al_2O_3$
 14.0%: $BaO$
 7.7%: $CaO$

* * * * *

UNITED STATES PATENT AND TRADEMARK OFFICE
CERTIFICATE OF CORRECTION

PATENT NO. : 4,122,460

DATED : October 24, 1978

INVENTOR(S) : James N. Humenik, Jimmie L. Powell, Rao R. Tummala

It is certified that error appears in the above-identified patent and that said Letters Patent are hereby corrected as shown below:

Column 10, line 37      after "+" insert --6--.

Signed and Sealed this

Twenty-sixth Day of February 1980

[SEAL]

Attest:

SIDNEY A. DIAMOND

Attesting Officer      Commissioner of Patents and Trademarks